United States Patent Office 3,152,957
Patented Oct. 13, 1964

3,152,957
PROCESS FOR MANUFACTURING PROTOANEM-
ONIN CONTAINING COTTON
Akira Sakuma, Kamakura-shi, Kanagawa-ken, and Shiro
Hirano, Mitaka-shi, Tokyo, Japan, assignors to Lion
Hamigaki Kabushiki Kaisha, Sumida-ku, Tokyo, Japan
No Drawing. Filed Jan. 22, 1963, Ser. No. 253,072
Claims priority, application Japan, Feb. 6, 1962,
4,591/62
5 Claims. (Cl. 167—84)

This invention related to a process for manufacturing protoanemonin containing cotton which releases protoanemonin at the use by effecting water.

More particularly, it is concerned with a protoanemonin containing cotton produced by impregnating ranunculin extracted from a plant belonging to Ranunculaceae with a cellulose material such as cotton and clothes and then coexisting it with the dry cellulose material treated with a basic agent. When ready to be used, water is applied to the preparation and ranunculin and alkali thereby gradually alluded from the cotton to generate the action therebetween, thus forming protoanemonin inside the cotton.

More particularly, it is concerned with a protoanemonin containing cotton which releases a desired amount of stable protoanemonin as an effective ingredient when administered to a living body.

According to the present invention, a desired amount of stable protoanemonin can be obtained, which exhibits various interesting biological activities such as antibacterial, toothache preventing, erythema producing activities and the like.

In accordance with the process of the present invention, a cotton preparation containing protoanemonin which readily forms an effective amount of protoanemonin by simple addition of water is produced. This is produced by first treating a cellulose material such as cotton and clothes with ranunculin extracted from a plant belonging to Ranunculaceae and thereafter coexisting the ranunculin impregnated cotton with a basic agent while preserving an anhydrous state.

As is known, protoanemonin exhibits various biological activities, but it has not been used because of its instability.

Protoanemonin is identifiable as γ-oxyvinyl acrylic acid lactone. It is an extraordinarily unstable colorless oily material and easily polymerized to anemonin or the other higher polymers. Its solutions can not be maintained at room temperature for a long time even by adding an antioxidant to it. Thus, it is very difficult to make protoanemonin preparation. R. Hill et al. (Biochem. Journal vol. 49, pp. 332 to 335 (1955)) reported that ranunculin is a stable compound melting at 143° C. and can be extracted from a plant belonging to Ranunculaceae. They reported also that protoanemonin could be obtained by steam-distilling ranunculin with sodium acetate and thus odor of protoanemonin could be slightly detected by reacting sodium hydroxide detected by reacting sodium hydroxide with ranunculin and soon after it disappeared.

Although ranunculin is inactive material and does not show any antibacterial activities, protoanemonin exhibits a wide range of antibacterial activities and other biological activities. Thus, manufacture of stable preparation of protoanemonin has been long desired.

An object of this invention is to provide a protoanemonin containing cotton preparation which releases an effective concentration of stable protoanemonin when desired for use by adding water.

Another object of this invention is to provide a protoanemonin containing cotton preparation having a controlled pH value suitable for applying to a living body.

When the phenol-phthalein reagent is added to the preparation, the end point of the reaction is known from the colour-vanishing.

Still another object of this invention is to provide a biologically active cotton preparation in which protoanemonin is produced from ranunculin.

In accordance with this invention, cotton or clothes may be dipped into ranunculin solution so as to apply rancunculin thereto, this being followed by heating to dry. Alternatively, ranunculin solution may be sprayed on the cotton or clothes followed by heating to dry. The cotton or clothes may have been previously coated with a basic agent which is maintained in an anhydrous state, with the ranunculin thereafter being applied thereto, or vice versa.

Otherwise, a separately prepared cotton containing ranunculin may be overlapped on the cotton already treated with a basic agent, or powdered basic agent may be directly applied to the cotton or clothes treated with ranunculin. The basic agent to be added may be used together with inactive carriers or adhesives. Acidic buffers may be added to them, if desired with a coating of water-soluble film. Antioxidant also may be added. But mixing ranunculin with a basic agent should be avoided under the presence of water.

The basic agent which may be used for the practice of this invention includes, basic alkali phosphate such as tertiary sodium phosphate, and such alkali metal carbonates as sodium carbonate.

The acidic buffer to be employed in this invention should have buffer effect when it is dissolved in water together with the said basic agent. Preferable substances are acidic salts such as primary potassium prosphate, primary sodium sulphate, and such organic acids as crotonic acid, acetoacrylic acid, senecioic acid, sorbic acid, palmitic acid, stearic acid, dehydroacetic acid, lauroyl sarcosin, phthalic acid, salicylic acid and the like.

This invention also contemplates the addition of an antioxidant to the protoanemonin cotton preparation hereinbefore described. The addition of such antioxidant greatly improves the stability or the protoanemonin formed as well as the increase in the long-lasting effect thereof without resulting in any delay in the reaction rate of the formation of protoanemonin. Typical antioxidants are propyl gallate, isoamyl gallate, ethyl protocatechuate, butyl hydroxy anisole, 2,2'-methylene bis-(4-methyl-6-tertiary butyl phenol), 2,6-di-tertiary butyl hydroxy toluene, nordihydroguaiaclic acid, 3,4-bis-(3,4-dihydroxyphenyl)-n-hexane, 3,4-bis-(3 - hydroxy - 4-ethoxyphenyl)-n-hexane, etc.

The amount of the basic agent added to react with ranunculin should be enough to be able to form an effective proportion of protoanemonin in the solution and usually should be at least $\frac{1}{10}$ of the ammont of ranunculin used. If desired, acidic buffer may be added and it must be noted that this should be dissolved after completion of the reaction between ranunculin and the basic agent. The antioxidant serves to prevent protoanemonin formed from polymerization or hydrolysis and has an improved effect in a small amount. Moreover, any other suitable substances such as adhesives, inactive carriers and odoring agents may be mixed together, if desired.

The ranunculin cotton preparation obtained in accordance with this invention easily forms an effective amount of protoanemonin in a short period of time simply by adding water when it is administered to a body and thus exhibits variable interesting biological activties.

The invention will be more accurately explained by the following examples.

*Example 1*

0.2 ranunculin was dissolved in 10 cc. of 50% alcohol and the solution thus produced was absorbed in 0.2 g.

cotton. The cotton was dried by heating under suction. Separately 0.2 g. sodium carbonate was dissolved in 1 cc. of water, coloured up with phenolphthalein reagent, and the solution thus prepared was absorbed in 0.1 g. cotton followed by heating to dry. 20 mg. of cotton bearing rununculin and 2 mg. of said cotton bearing sodium carbonate were used together and added with 0.5 cc. water and administered to a living body. These formed 0.2% protoanemonin solution by pressing.

*Example 2*

3 g. gauze was sprayed with a solution consisting of 1 g. ranunculin and 20 cc. of 50% alcohol and thereafter heated to dry. Another 3 g. gauze was separately sprayed with 20 cc. of 0.05 M sodium phosphate solution and thereafter heated to anhydrous state. Said two gauzes prepared separately were administered together to a body after wetting them with 20 cc. of water. These formed 0.2% protoanemonin solution by pressing.

*Example 3*

3 g. gauze sprayed with 20 cc. of 1% senecioic acid and heated to dry was applied to outward of said ranunculin bearing gauzes in the Example 2, and administered to a body after wetting them with 20 cc. water. This produced 0.1–0.2% protoanemonin solution and pH of the solution was neutral.

*Example 4*

0.1 g. salicylic acid was dissolved in 2 cc. alcohol and then absorbed in 0.1 g. cotton followed by heating to dry. 2 mg. of thus treated cotton were administered to a body together with 20 mg. of said ranunculin bearing cotton and with 2 mg. of said sodium carbonate bearing cotton after wetting them with 0.5 cc. water. The solution produced by press showed 0.1–0.2% protoanemonin concentration and pH of the solution was neutral.

What we claim is:

1. A process for producing a cellulosic preparation for supplying effective amounts of protoanemonin upon addition of water thereto which comprises impregnating a cellulosic material with ranunculin solution, impregnating a second cellulosic material with a basic agent and heating to dry, maintaining said first and second impregnated cellulosic materials in contact under anhydrous conditions so that said basic agent and ranunculin are maintained in intimate contact without the formation of protoanemonin, said resulting composite of cellulosic materials providing protoanemonin upon addition of water thereto.

2. A process for producing a cellulosic cotton preparation for supplying effective amounts of protoanemonin upon addition of water thereto which comprises impregnating a cellulosic material with ranunculin solution and heating to dry, impregnating a second cellulosic material with a basic agent and heating to dry, overlapping the second cellulosic material upon said first cellulosic material so that said basic agent and ranunculin are maintained in intimate contact under anhydrous conditions, said cellulosic material providing protoanemonin upon addition of water thereto.

3. A process of claim 2 wherein the amount of basic agent in said composite cellulosic composition is at least one-tenth of the amount of ranunculin therein.

4. An article capable of providing protoanemonin upon addition of water thereto which comprises cotton impregnated with ranunculin and a basic agent, said ranunculin and basic agent being maintained under anhydrous conditions until said article is put to use, the addition of water to said article providing a protoanemonin solution.

5. The article of claim 4, wherein said article comprises an intimate admixture of cotton impregnated with ranunculin, and other portions of cotton separately impregnated with a basic agent, said cotton being overlapped so as to maintain said ranunculin and basic agent in intimate contact under anhydrous conditions until said article is put to use.

References Cited in the file of this patent

UNITED STATES PATENTS 2,371,390     Graue _____ Mar. 13, 1945

OTHER REFERENCES

Chem. Abstracts 48, No. 12070F, No. 13169B (1954).